Aug. 7, 1923.

F. L. LA TULIP

TIRE CASING

Filed Oct. 16, 1922

1,464,206

Fred L. La Tulip, Inventor.

Patented Aug. 7, 1923.

1,464,206

UNITED STATES PATENT OFFICE.

FRED L. LA TULIP, OF LOS ANGELES, CALIFORNIA, ASSIGNOR OF FIVE-EIGHTHS TO W. D. NICHOLSON, OF LONG BEACH, CALIFORNIA.

TIRE CASING.

Application filed October 16, 1922. Serial No. 594,767.

*To all whom it may concern:*

Be it known that I, FRED L. LA TULIP, a citizen of the United States, residing in the city of Los Angeles, county of Los Angeles, and State of California, have invented certain new and useful Improvements in Tire Casings, of which the following is a specification.

My invention relates to tire casings, and more particularly to the use of a material for reinforcing and building up the body of said casing involving a new mode of construction and resulting in a superior finished article. I have found by experiments that rawhide can be used in the construction of tire casing and if used in accordance with my mode of construction will make a most effective reinforcement for a tire casing and one which will wear much longer than will the materials now used. In developing my mode of construction, I have taken strips of rawhide of sufficient width to be perforated or punched with small openings therein and have placed them diagonally around the casing, from one side to the other, at a space apart, so as to leave a narrow space between each strip, then applying a layer of rubber composition, and then applying another layer of rawhide strips diagonally in the opposite direction over the first layer, and applying another layer of rubber, or other suitable composition, and then applying a third layer of strips of rawhide in the same general diagonal direction of the first layer of strips, but shifted circumferentially of the tire so that each strip will overlie the space between the two strips thereunder, thus covering the entire area with the three or more layers of rawhide, with rubber composition between and through the strips, and forming the tread of the tire casing.

In order to more clearly explain my invention, I have illustrated one embodiment thereof on the accompanying sheet of drawings, which I will now describe. In the drawings,—

Figure 1:
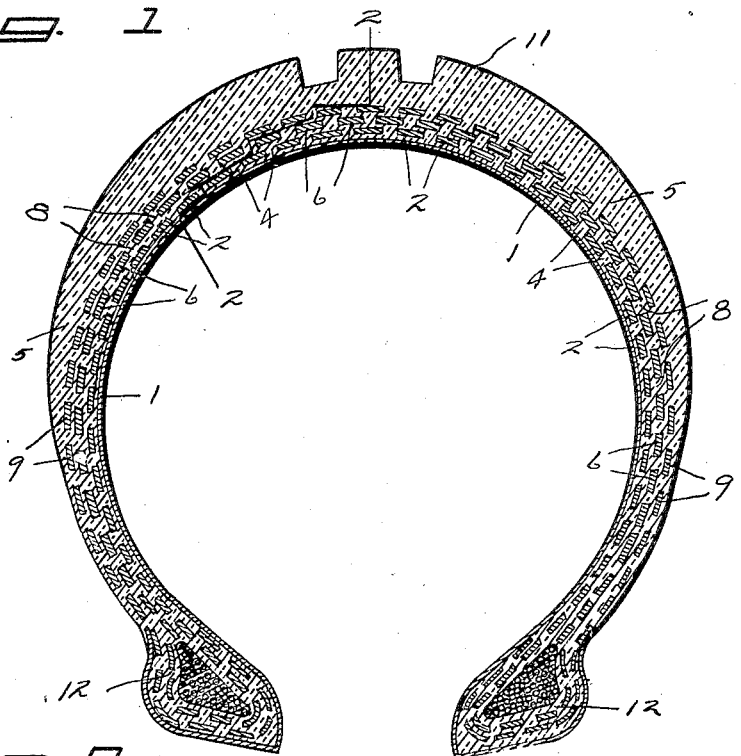
Figure 1 is a cross sectional view through a tire embodying the invention.
Figure 2:
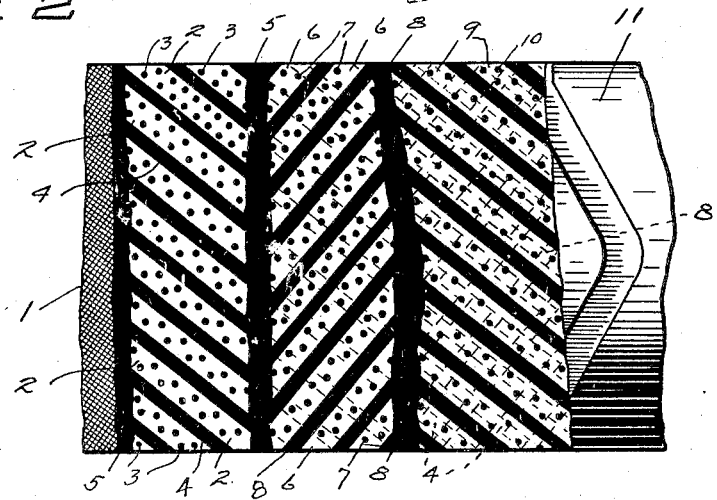
Figure 2 is a top plan view, showing the different layers.

Referring now to the drawings in detail, the innermost layer of the tire casing can be made of any suitable fabric material, and is designated 1, over which is laid a layer of strips of rawhide, 2, 2, each shown perforated, as at 3, 3, and with the space, 4, between each two strips. Over this layer of rawhide strips is placed a layer of rubber composition, designated, 5, which fills the spaces 4, and also the perforations, 3. Over this layer of rubber composition, in the opposite direction, is a second layer of rawhide strips, 6, 6, perforated, as at 7, 7, and that is covered with a second layer of rubber composition, as indicated at 8. Over this second layer of rubber composition is placed a third layer of rawhide strips, 9, 9, also perforated, as at 10, 10. These strips are so placed that they overlie the spaces, 4, in the first layer of rawhide strips, as indicated by the dotted lines in Fig. 2, thus covering the entire area with the strips of rawhide and not leaving any radial opening, or uncovered spot, through which a sharp article might pass to the interior of the casing. The outer, or tread, portion of the casing is built up in any desired design, and to any desired extent, as at 11, with the rubber composition, or any other suitable tread material. The strips of rawhide are of sufficient width to be perforated and of sufficient length, preferably, to extend from one edge of the tire over to the other, and some of them can be turned around the heels, 12, of the tire casing, as illustrated and thus the whole structure is vulcanized into one homogeneous casing body, the strips of rawhide being kept sufficiently separated from each other as not to cut or wear one upon the other and being protected so as to maintain their desirable flexibility and toughness.

I am aware that changes can be made in the general arrangement of rawhide strips as a reinforcing means for tire casings without departing from the spirit of my invention, and I do not limit my invention to the particular showing made for illustrative purposes, except as I may be limited by the hereto appended claims.

I claim:

1. In a tire casing, an inner fabric layer, one or more layers each made up of strips of rawhide spaced apart and arranged diagonally over the casing, in opposite diagonal directions, said strips being perforated to receive a rubber composition, and a tread covering said diagonal rawhide strips, substantially as described.

2. A tire casing of the character referred to comprising a casing body made up of layers of rawhide in ribbon form, spaced to permit the tire composition to fill in therebetween, said layers of rawhide being diagonally disposed and crosswise of each other, and a tread portion built up over said strips of rawhide and formed of a rubber composition filling the spaces between said strips of rawhide and vulcanized into a homogeneous casing body.

Signed at Los Angeles, California, this 10th day of October, 1922.

FRED L. LA TULIP.

Witnesses:
W. R. LITZENBERG,
MAI FIELD DOUGLAS.